J. OSBORNE.
HOSE SWIVEL.
APPLICATION FILED DEC. 4, 1912.
1,157,715.
Patented Oct. 26, 1915.
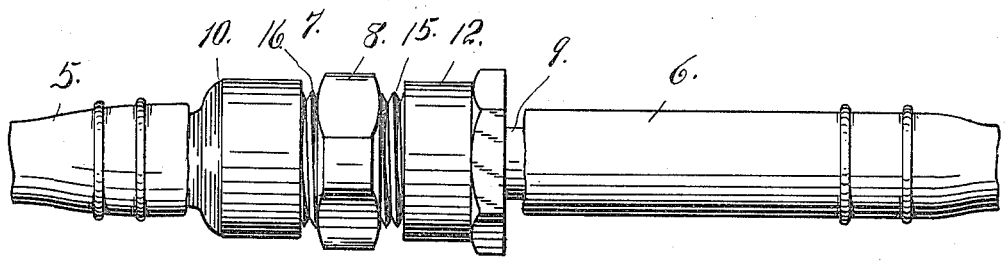
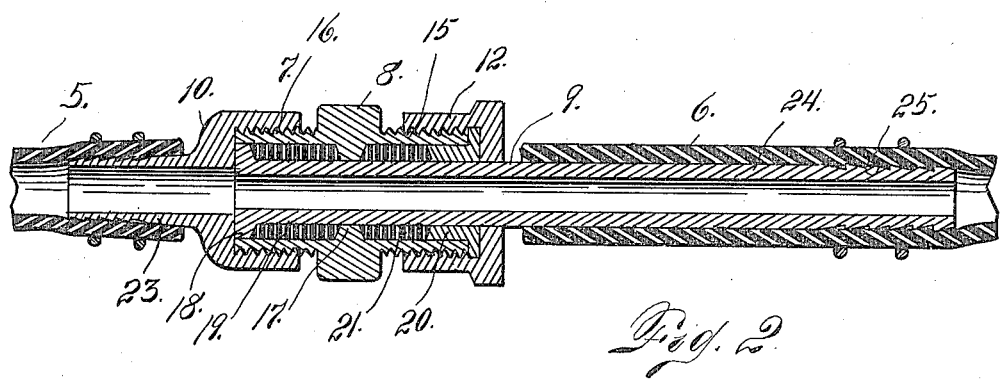
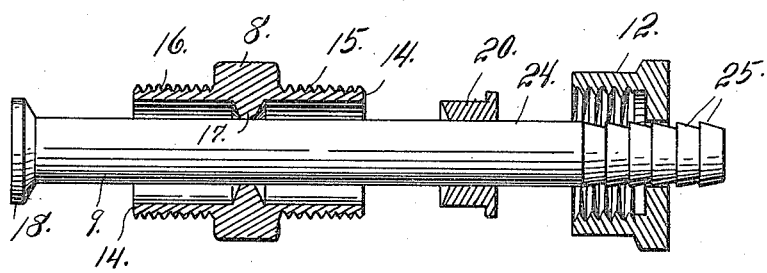
Witnesses
C. H. Roessner.
Otto E. Hoddick.
Inventor
John Osborne.
By
Attorney.

UNITED STATES PATENT OFFICE.

JOHN OSBORNE, OF HOTCHKISS, COLORADO.

HOSE-SWIVEL.

1,157,715.

Specification of Letters Patent.

Patented Oct. 26, 1915.

Application filed December 4, 1912. Serial No. 734,381.

*To all whom it may concern:*

Be it known that I, JOHN OSBORNE, a citizen of the United States, residing at Hotchkiss, county of Delta, and State of Colorado, have invented certain new and useful Improvements in Hose-Swivels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in swivel joints for hose, my object being to provide a construction whereby a hose line, as a garden hose, spraying hose or fire hose, may be provided with joints at suitable intervals, of such construction that one member of the joint, or the member connected with one hose section, may turn freely within the member connected with the other hose section, to prevent the bending or kinking of the hose in such a manner as to interrupt the free flow of fluid therethrough.

My improved construction is also equally applicable to hose for carrying fluids of all kinds, as air, or motive fluid for pneumatic tools of all descriptions.

Having briefly outlined my improved construction, I will proceed to describe the same in detail, reference being made to the accompanying drawing, in which is illustrated an embodiment thereof.

In this drawing: Figure 1 is an elevation of a hose pipe connected by means of a swivel joint of my improved construction. Fig. 2 is a central longitudinal section of the same. Fig. 3 is a view partly in section illustrating the joint members, but not assembled in operative relation.

The same reference characters indicate the same parts in all the views.

Let the numerals 5 and 6 designate the two sections of hose pipe to be connected by my improved joint, which may be designated in its entirety by the numeral 7. This joint includes members 8, 9, 10 and 12. The member 8 consists of a sleeve threaded at both extremities, as shown at 15 and 16, and having an interiorly projecting, centrally located collar 17 which engages the member 9, the latter consisting of a tubular stem which passes axially through the sleeve 8 and is provided at one extremity with an enlargement or head 18 which fits the bore of the sleeve, the said head forming a chamber around the stem 9 and between the collar 17 and the head, in which is located a packing 19 to form a fluid-tight joint. In the opposite extremity of the sleeve is inserted a gland 20 forming a chamber between itself and the collar 17, in which a packing 21 is located. This construction is of the stuffing-box type. The gland is secured in place by the interiorly threaded cap 12, which is screwed upon the exterior screw threads 15 of the sleeve 8. The perforation in this cap fits the stem 9. The member 10 of the coupling constitutes a cap which is screwed upon the threads 16 of the member 8, the said member 10 having a reduced extension 23 which enters the hose pipe member 5 and is secured thereto in the usual, or any suitable manner. The hollow stem 9 has an extension 24 which projects beyond the sleeve 8 and enters the hose pipe section 6, its extremity being circumferentially toothed or roughened, as shown at 25, to facilitate the forming of a proper connection with the hose pipe member. Any suitable means, however, may be applied exteriorly to the hose section for the purpose of securely connecting the latter to the hollow stem.

From the foregoing description it must be understood that the portion of the hollow stem which passes through the sleeve 8 and the cap 12 is adapted to rotate therein, thus making it practicable for one section of the hose pipe to turn freely with reference to the other section, while at the same time the coupling connection, or joint, is fluid-tight.

Having thus described my invention, what I claim is:

A swivel joint for hose pipe comprising two members respectively secured to the two sections of hose, the first member consisting of a relatively long hollow stem, while the second member consists of a screw-cap having a hollow stem extension, a sleeve having an interiorly projecting collar midway its extremities and exteriorly threaded upon both sides of said collar, said sleeve surrounding the first member and threaded into the second member, the first member having a head at one extremity of the sleeve, a gland at the opposite extremity of the sleeve, the latter having an interiorly projecting collar opposite the exterior collar forming packing chambers between the head of the first member and the gland, packing located in said chambers and a screw-cap surrounding the first member and threaded on the sleeve for securing the gland in place, the said screw-cap and second member being adjustable to vary the pressure upon the packing, while the first named member is freely rotatable within the sleeve, substantially as described.

In testimony whereof I affix my signature in presence of two witnesses.

JOHN OSBORNE.

Witnesses:
ADAM SEAGER,
HARRY H. ADDAMS.

Copies of this patent may be obtained for five cents each, by addressing the "Commissioner of Patents, Washington, D. C."